(12) United States Patent
Manis et al.

(10) Patent No.: US 7,286,812 B2
(45) Date of Patent: Oct. 23, 2007

(54) COUPLING BETWEEN POWER LINE AND CUSTOMER IN POWER LINE COMMUNICATION SYSTEM

(75) Inventors: Constantine N. Manis, Monmouth Junction, NJ (US); Oleg Logvinov, East Brunswick, NJ (US); Larry Durfee, Washington, NJ (US)

(73) Assignee: Arkados, Inc., Piscataway, NJ (US)

( * ) Notice: Subject to any disclaimer, the term of this patent is extended or adjusted under 35 U.S.C. 154(b) by 799 days.

(21) Appl. No.: 10/219,520

(22) Filed: Aug. 15, 2002

(65) Prior Publication Data

US 2003/0054793 A1    Mar. 20, 2003

Related U.S. Application Data

(60) Provisional application No. 60/313,051, filed on Aug. 17, 2001.

(51) Int. Cl.
 *H04M 9/00* (2006.01)
(52) U.S. Cl. .................. 455/402; 455/426.1; 455/14
(58) Field of Classification Search .............. 455/3.01, 455/426.2, 561, 402, 401, 14, 426.1; 343/713; 379/239, 167.14
See application file for complete search history.

(56) References Cited

U.S. PATENT DOCUMENTS 4,777,652 A * 10/1988 Stolarczyk ................ 455/3.03
5,272,350 A   12/1993 Solari et al.
5,559,377 A    9/1996 Abraham
5,818,127 A   10/1998 Abraham
5,994,998 A   11/1999 Fisher et al.
6,069,588 A *  5/2000 O'Neill, Jr. ................ 343/713
6,317,089 B1* 11/2001 Wilson et al. .............. 343/713

OTHER PUBLICATIONS

Pages 87-120 of "The Essential Guide to Home Networking Technologies", published 2001 by Prentice Hall, Inc., by Gerard O'Driscoll.
Home Plug Standard Brings Networking to the Home, Dec. 2000, vol. 16, No. 12 Communication Systems Design Magazine.

* cited by examiner

*Primary Examiner*—Temica Beamer
(74) *Attorney, Agent, or Firm*—Mintz, Levin, Cohn, Ferris, Glovsky and Popeo, P.C.

(57) ABSTRACT

Apparatus for coupling communication signal modulated radio frequency signals between an electrical power distribution line and the electrical power wiring at a customer's premises which includes a first transceiver for transmitting and receiving electromagnetic energy is inductively coupled to the distribution line and a second transceiver for receiving electromagnetic energy from, and transmitting electromagnetic energy to, the first transceiver. The second transceiver is coupled to the customer's power wiring to receive communication signals from, and to supply communication signals to, the customer's power wiring. The electrical power for the first transceiver can be supplied by inductive coupling to the power line and/or a battery, the battery being a back-up source when both inductive coupling and a battery are present.

9 Claims, 4 Drawing Sheets

COUPLING BETWEEN POWER LINE AND CUSTOMER IN POWER LINE COMMUNICATION SYSTEM

RELATED APPLICATION

Benefit of provisional application Ser. No. 60/313,051, filed Aug. 17, 2001 and in the name of the inventors named herein is claimed and is incorporated herein by reference.

FIELD OF THE INVENTION

The present invention relates to power line communication (PLC) systems for residential, business or other environments to support communications between in-home electronic devices and communications with external destinations (e.g., broadband access to the Internet) and, particularly, to the coupling of communication signals between an electrical power distribution line and equipment for processing the signals in homes or business establishments.

BACKGROUND

Power line communication (PLC) systems are well known in the art. See, for example, the book entitled "The Essential Guide to Home Networking Technologies" published in 2001 by Prentice-Hall, Inc., copending U.S. application Ser. No. 09/290,255, filed Apr. 12, 1999, the web site http://www.homeplug.org of the Home Plug Special Interest Group and the article entitled "Home Plug Standard Brings Networking to the Home" in the December 2000 issue, Vol. 16, No. 12, of the Communication Systems Design magazine.

Power line communications for access is a powerful technology that offers the consumer many real advantages over other forms (e.g., DSL, cable modems, etc.). These advantages include: power distribution networks to all homes and businesses are already in place, and PLC technology has been demonstrated to work at high data rates, as well as many other advantages. One of the problems solved by this invention is making the communications connection in a low cost manner between the power line distribution cables or wires, such as the pole-mounted cables or wires (any segment of the power line distribution network applies here including, but not limited to the LV (low voltage) and MV (medium voltage) networks and the home or business offices. Connecting to the power distribution network can be difficult and expensive requiring turning off network power during installation.

Power line communication systems of the type to which the invention relates apply modulated radio frequency carriers, e.g. carriers having frequencies in the range from about 2-9 MHz for access and from about 5 MHz to 20 MHz, for in home communications to power lines.

Electrical power distribution systems, commonly used in the United States, distribute the electrical power at 60 Hz from the source over cables, insulated or uninsulated. At the source, the voltage is high, e.g., over 200,000 volts and by means of transformers, the voltage is reduced by a transformer or transformers to a medium voltage, e.g., of the order of 20,000 volts, to be delivered to consumers by at least three cables or wires suspended from poles. At some of the poles, there are transformers which further reduce the voltage to low voltage of the order of 117 volts between a cable and a ground or neutral cable for the delivery of power to one or more customers or consumers. The power lines from the output of a pole transformer to the customers premises connect to a power consumption meter which in turn connects to the wiring in the customer's premises (e.g., home power wiring).

While the pole transformer and the power consumption meter cause comparatively little power loss at the low frequency at which the power is supplied, both the transformer and the meter can cause substantial radio frequency, communication signal power loss. Therefore, a parallel communication signal electrical path around at least the pole transformer has been provided to improve the communication signal power in the premises wiring. However, the prior art proposals for the parallel path have involved conductive (galvanic) connections both at the input and output of the pole transformer which requires skilled installers and in at least some cases, interruption of the power during installation of parallel path, by-pass equipment.

An object of the invention is to improve the transfer of communication signal power at the input of a lossy element, such as a low frequency transformer or a power consumption meter, to a power line or other equipment at the output side of the lossy element and particularly, to increase the communication signal power in the consumer's premises' wiring, and thereby improve the operation and reliability of the communication system without requiring interruption of the delivery of electrical power and without conductive connections to the medium voltage power lines.

BRIEF SUMMARY OF THE INVENTION

The invention permits inexpensive and low cost installation of communications connections between power line distribution networks and the electrical wiring at a power consumer's premises by providing a non-galvanic, by-pass, communication signal path around at least the power transformer which connects to the wiring of the customer's premises.

In accordance with the preferred embodiment of the invention, a coupler is inductively coupled to the medium voltage power line by at least one induction coil encircling a medium voltage conductor. The coupler includes a PLC transceiver for the communication signals and a power supply for the transceiver. Communication signals on the power line conductor are supplied to the transceiver and are supplied from the transceiver to the power line by the induction coil or coils. Electrical power at the power line frequency is also supplied to the power supply by the induction coil or coils. The transceiver is also coupled to an electromagnetic energy transmitter and an electromagnetic energy receiver for transmitting electromagnetic energy modulated by the communication signals and for receiving electromagnetic energy modulated by communication signals. The communication signals received by the transceiver are transferred to the power line by the induction coil or coils.

Alternatively, if desired, instead of energizing the transceiver from a power supply receiving power from the power line by way of an induction coil, the power supply can be a conventional solar panel source with a backup battery. Also, if desired, the solar panel source and back-up battery can be used with the induction coil energized power supply for back-up in the event of power failure.

In the preferred embodiment, the electromagnetic energy transmitter and receiver are, respectively, an infra-red energy transmitter and an infra-red energy receiver. However, as an alternative, the electromagnetic energy transmitter and receiver can be, respectively, a radio frequency energy transmitter and a radio frequency energy receiver.

In order to avoid conductive (galvanic) connections at the input side of the pole transformer, temporary interruptions of electrical power for making the connections and the services of a power line workman, the induction coil or coils are formed so as to have separable parts, e.g. similar to a known type of clamp on ammeter, so that the coil or coils can be applied to the medium voltage cable by separating the parts, encircling the cable with the parts and pressing the parts together. Although there can be only one conduction coil for inter-coupling the power cable and both the power supply and the transceiver, preferably there are two induction coils so that each coil can be constructed to provide the most efficient transfer of power between the cable and the coupler. Thus, one coil will couple the transceiver to the cable and the other coil will couple the power supply to the cable. Of course, if a solar panel and a battery are employed to supply electrical power to the transceiver, only one coil for coupling the transceiver to the cable at radio frequencies would be required.

Preferably, the coil or coils are contained in a single weather resistant housing which clamps onto the cable so as to remain in a fixed position relative to the cable. When the coil has parts, e.g. two parts, for the reasons set forth hereinbefore, the parts can be held together in the positions at which they clamp onto the cable by any conventional securing means, e.g. screws, bolts, latches, etc.

Also, the transceiver, the power supply and their inter-connections will be enclosed in a weather resistant housing which is secured in a water tight manner to or encloses the coil housing and the transceiver.

In the preferred embodiment, the apparatus of the invention includes what will be called a "base unit" which is mounted on the power line pole adjacent to the coupler and so as to receive, and transmit to, electromagnetic energy transmitted by, and received by, the transmitter and receiver of the coupler. Because the transmitter of the coupler will have a relatively low power output when the power supply for the transceiver is coupled to the electrical cable by an induction coil, the base unit is located on the power line pole as close as possible, depending on the pole structure, transformer location and voltage breakdown resistance requirements, to the coupler which will normally be located close to a power line insulator.

However, if the coupler transmitter has sufficient power output and the distance between the coupler and a building of the customer's premises is sufficiently short, the base unit can be mounted on the building.

Preferably, the electromagnetic energy is transmitted and received between the coupler and the base unit using free air as the transmission medium. However, the transmission medium can be a relatively short length of optical fiber cable in the case of electromagnetic energy for which the medium is suitable, e.g., infra-red energy, or can be a short length of co-axial cable when the electromagnetic energy is radio frequency energy. The use of an optical fiber or co-axial cable link can be advantageous in that the orientation of the base unit with respect to the coupler will be unimportant and the effects of wind and other weather conditions will have little, if any, effect on the transmissions between the base unit and the coupler.

The base unit also comprises a transceiver and a power supply. The transceiver has a receiver for receiving the modulated electromagnetic energy transmitted by the coupler and transmitting the so-received energy in the same or modified form to the in-premises power line and/or the conventional in-house (building) communication apparatus. To avoid the power consumption meter loss of communication signal power, the base unit can supply the communication signals to the house or building side of the meter.

The base unit transceiver also comprises a transmitter for transmitting to the coupler electromagnetic energy receivable by the coupler modulated with communication signals generated in and received from the house or building.

Preferably, the medium for transmitting between the base unit and the in-house or in-building PLC line or apparatus is a cable suitable for conveying the output of the base unit transmitter and the input of the base unit receiver. However, the in-house or in-building apparatus can include a further transceiver for receiving and transmitting the electromagnetic energy respectively transmitted and received by the base unit to and from the house or building. The electromagnetic energy can be radio frequency or infra-red energy and the transmission medium can be free air.

The base unit also comprises a power supply for energizing the transceiver and any other electrical components in the base unit. Electrical power can be supplied to the base unit by wires connected to low voltage wires either in the house or building or at the power line pole or the power supply can be a conventional solar panel with a back-up battery.

BRIEF DESCRIPTION OF THE DRAWINGS

The invention will be further described in conjunction with the accompanying drawings in which.

DETAILED DESCRIPTION OF EMBODIMENTS OF THE INVENTION

Figure 1:
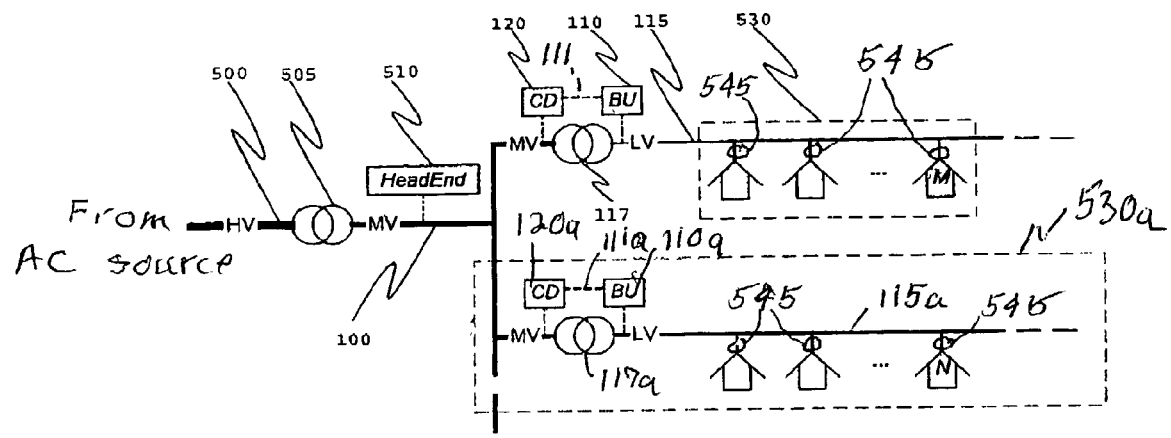
FIG. 1 is a schematic diagram of a known electrical power distribution system with a coupler and base unit of the invention therein.

FIG. 1 illustrates schematically an electrical power line distribution system frequently used in the United States although the invention is not limited to use in such a system. Although the power lines are illustrated as single cables, normally there is a plurality of insulated conductors in each cable or there is a plurality of separate cables, either insulated or uninsulated. For purposes of illustration, only one cable need be considered.

The high voltage (HV) cable 500 in FIG. 1 is connected to a source, such as a transformer connected to a generator of electricity at a low frequency, e.g., 50-60 Hz and to the input of a transformer 505. The voltage between conductors of the cable 500 can be on the order of at least 200,000 volts. The output of the transformer 505 is connected to a medium voltage (MV) cable 100, e.g., a cable operating at voltages on the order of 2000 volts. A head end unit 510 supplies communication signals to and receives communication signals from the MV cable.

Although the medium voltage cable 100 can be connected only to a single transformer 117, it is common practice to connect the cable 100 to a plurality of transformers 117, 117a, etc. The transformers 117, 117a, etc., lower the MV voltage to the voltage on the wiring in a house or business building, e.g., about 115-230 volts. Thus, the voltage on the low voltage (LV) cables 115, 115a, etc., which extend from the transformers 117, 117a, etc., to the plurality of homes or business buildings 530, 530a, etc., is about 115-230 volts. The power cables 115 are connected to the internal power wiring of the homes or buildings through power consumption meters 545, and the homes and buildings 530, 530a, etc., have communication apparatus coupled to the internal power wiring for processing the communication signals.

FIG. 1 also illustrates the coupling of the couplers 120, 120a, etc., of the invention to the MV power line, the coupling of the base units 110, 110a, etc., of the invention to the LV power lines 115, 115a, etc. The transmission of electromagnetic energy from the couplers to the base units is indicated by the dotted lines 111 and 111a.

Figure 2:
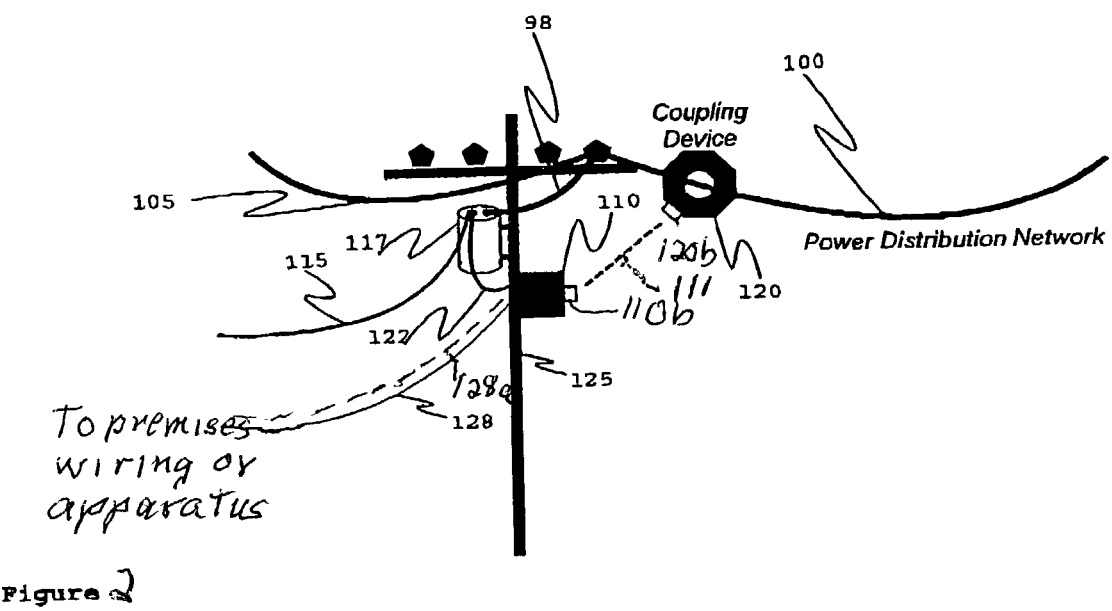
FIG. 2 is a schematic diagram illustrating a typical suspension pole of a power line distribution system with the coupler coupled to one power line medium voltage cable and the base unit mounted on the pole.

FIG. 2 illustrates schematically one suspension pole 125 on which an electrical power transformer 117 is mounted. Electrical power is delivered to the homes and buildings 530 through the cable 115 and in this embodiment, is delivered to the base unit 110 through the cable 122. Generally speaking, the cables 115 and 122 are three separate, insulated and stranded conductors. The MV cable 100 is connected to the transformer 117 by the cable 98.

The coupler 120, which is described in greater detail hereinafter, has at least one induction coil encircling the cable 100 and an electromagnetic energy transducer 120b which transmits electromagnetic energy to, and receives electromagnetic energy from the base unit 110 which, in this embodiment, is mounted on the pole 125. As mentioned hereinbefore, the base unit 110 can be mounted elsewhere if the communication signal power is sufficient to provide the desired signal power at the base unit 110.

In a preferred embodiment of the invention, the transducer 120b emits and receives infra-red energy and the base unit 110 has a similar transducer 110b. The infra-red energy can be transmitted through the air along the path 111, and in this event, both transducers would have relatively wide beams, or windows, to ease the aligning of the transducer beams and to reduce possible effects of weather conditions, such as wind, on the alignment.

Alternatively, the transducers 120b and 110b can be interconnected by an infra-red energy transmitting cable.

Electromagnetic energy other than infra-red, such as radio frequency energy, can be used to intercouple the base unit 110 and the coupler 120. In such event, the transducers 110b and 120b would each be a radio frequency transmitter and receiver, and the transmission medium can be air or a cable which transmits radio frequency energy, such as a co-axial cable.

Although the base unit 110 can deliver the communication signal energy to the home or business building power wiring (premises power wiring) by way of the power cable 115 or the power cable 122, it is preferred that it be delivered directly to the premises wiring or the communication signal processing apparatus at the premises. Thus, the base unit 110 can be coupled to the premises wiring or the communication processing apparatus by infra-red energy or radio frequency energy using the air (see dotted line 128a in FIG. 2) as the transmission medium, but preferably, the base unit 110 is connected to the premises wiring or apparatus by a cable 128 which can convey the energy selected. If the coupling energy cannot be used as delivered, it will be apparent to those skilled in the art that any necessary converters and/or transducers can be located at the premises for supplying the communication signal energy appropriate for the system in use on the power wiring in the house or business building.

Figure 3:
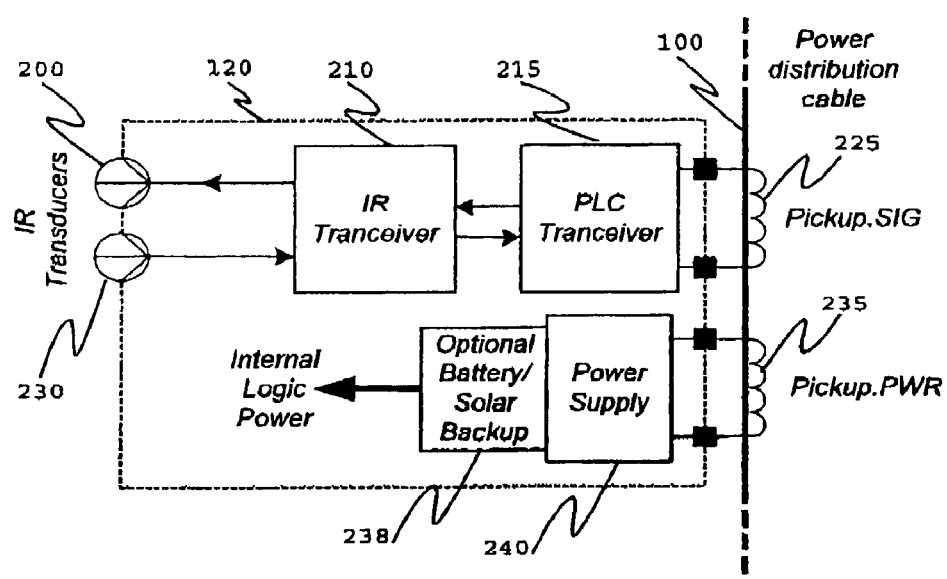
FIG. 3 is a block diagram of the coupler coupled to the power line.

FIG. 3 is a schematic and block diagram of a coupler 120 which uses infra-red energy as the electromagnetic energy coupling the coupler 120 to the base unit 110. In this embodiment, the coupler has two induction coils 225 and 235 encircling the MV power cable 100, but as explained hereinafter, one induction coil 225 may be sufficient. In the embodiment shown, two induction coils are preferred since electrical energy of greatly different frequencies, one at 50-60 Hz and one at MHz, is coupled from the power cable 100 to the coupler 120. With two induction coils, each coil can be designed to have the maximum coupling efficiency for the energy being supplied to the coupler 120 from the cable 100. For example, the coil 225 can be made resonant at the frequencies or several frequencies of the carriers in the cable 100.

In the embodiment illustrated in FIG. 3, modulated communication signals in the cable 100 are supplied to a PLC transceiver 215. The PLC transceiver implements one of many technologies to send a receive data over the power line. The PLC transceiver 215 implements a PLC Media Access Control (MAC) and Physical Layer (PHY) protocol while an IR link PHY and point to point protocol is also implemented in 210. The output of the transceiver 215 is supplied to the input of an infra-red (IR) transceiver 210. The output of the transceiver 210 is supplied to an infra-red transmitter 200 forming part of the IR transducer 120b (FIG. 2). An IR receiver 230 is coupled to the IR transceiver 210 for supplying received IR energy thereto, and the communication signal information on the received IR energy is supplied to the transceiver 215 where it is converted to a form which meets the protocol for communication signals on the power cable 100 and supplied to the cable 100 by the induction coil 225.

If the electromagnetic energy transmitted and received by the coupler 120 is other than IR, e.g., radio frequency energy, then, the components 200, 230 and 210 would be replaced by components which can perform the same functions for the different electromagnetic energy.

FIG. 3 also illustrates two types of electrical power supply for the components of the coupler 120, only one or both of which can be used in the coupler 120. The power supply 240 is connected to the induction coil 235 which encircles the power cable 120. At the electrical power frequencies, e.g., 50-60 Hz, the coil 235 with the cable 100 acts as a transformer with a single conductor primary and a multiple turn secondary. Thus, the coil 235 supplies alternating current at the power frequency to the power supply 240 which converts the alternating current to direct current and supplies direction current to the electrical components of the coupler 120.

The induction coil 235 can also be connected to the transceiver 215 in place of the induction coil 225 to also supply communication signal energy to, and transfer the latter energy from, the cable 100, in which also, the coil 225 would be omitted. However, as mentioned hereinbefore, for energy transfer efficiency purposes, two induction coils 225 and 235 are preferred.

FIG. 3 also shows a battery solar backup power supply 238. It may be found that the electrical power supplied by the power supply 240 is insufficient or insufficient at times.

If desired, the coupler 120 can include a conventional battery power supply 238 with a solar panel recharger to supplement the power supplied by the power supply 240. Alternatively, the power supply 240 and the induction coil 235 can be omitted or disconnected and the electrical power to the components of the coupler 120 can be supplied solely by the power supply 238.

Figure 5:
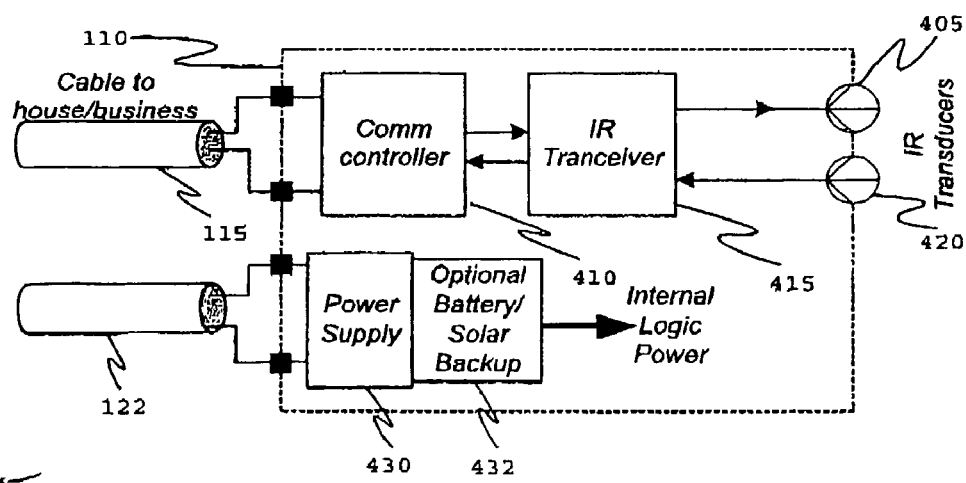
FIG. 5 is a schematic and block diagram of the base unit with wire connections to a house or business building internal wiring and communication signal apparatus.

FIG. 5 illustrates an embodiment of a base unit 110 which can be used with the coupler 120 illustrated in FIG. 3. The base unit 110 comprises an IR transmitter 405 and an IR receiver 420 which are included in the transducer 110b (FIG. 2). The base unit 110 includes an IR transceiver 415 for converting received IR modulated with communication signals to communication signals used in the premises system and for converting communication signals received from the premises system into IR signals modulated with the communication signals.

The base unit 110 can also include a known communications controller 410 coupled to the transceiver 415. The communications controller 410 would support one or more serial or parallel communications protocols and implements a Physical Layer (PHY) and a point-to-point protocol between the premises apparatus and the base unit 110. Preferably the controller 410 is a PLC transceiver.

In the embodiment illustrated in FIG. 5, the communications controller 410 is coupled to the premises apparatus or wiring by a cable 115 which can convey radio frequency carriers modulated with information, such as data signals. As previously mentioned, the cable 115 can be replaced by air or cable transmission of IR or radio frequency energy with a suitable transceiver of a type obvious to those skilled in the art at the premises.

The base unit 110 also includes power supplier 430 and 432 for the same purposes as the power supplier 240 and 238 in the coupler 120. Thus, one or the other can be used or the power supply 432 can be used as a back-up power supply. Electrical power is supplied to the power supply 430 by the cable 122 which is connected to the LV output of the transformer 117 (see FIG. 2). Alternatively, the cable 122 can be connected to power wiring at the premises.

Figure 4:
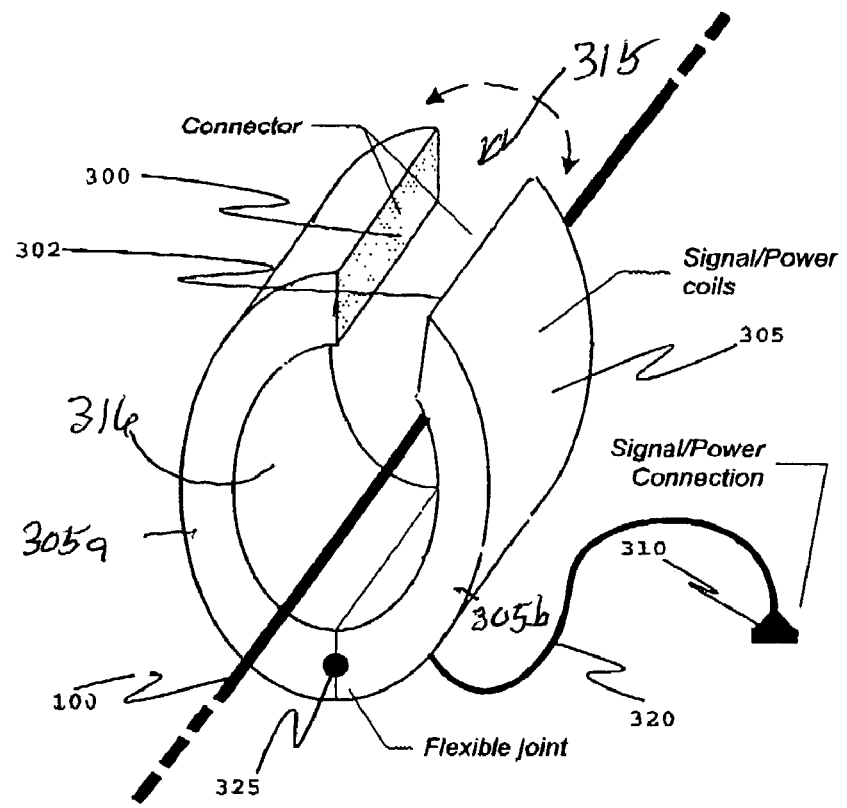
FIG. 4 is a schematic, perspective illustration of a split induction coil which can be used to couple a power line to the coupler.

FIG. 4 illustrates schematically a preferred embodiment of the induction coil 228 and 235 structure 305. The structure 305 includes both coils 225 and 235 and has two parts or portions 305a and 305b which are pivotally connected by a pin 325. The coils 225 and 235 are side-by-side in a casing, e.g., plastic casing and are continuous at the pin 305. However, the casing and the coils are separable at 315 to permit the passage of the cable 100. The scale is exaggerated because the opening 316 should be equal to the diameter of the cable 100 when connectors 300 and 302 are in engagement so that the casing will securely engage the cable 100 and prevent movement of the casing with respect to the cable 100.

The faces of the separable parts 305a and 305b which abut when the casing engages the cable 100 have interengaging contacts 300 and 302 which provide continuity of the turns of the coils 225 and 235. By making the casing separable, it is unnecessary to cut or interrupt the cable 100, and the coils 225 and 235 are electrically insulated from the cable 100 by insulation on the cable 100, if present, and/or the material of the casing which is between the coils 225 and 235 and the cable 100.

The coils 225 and 235 are connected, respectively, to the transceiver 215 and the power supply 240, by a multi-conductor cord 320 with a plug 310.

Figure 6:
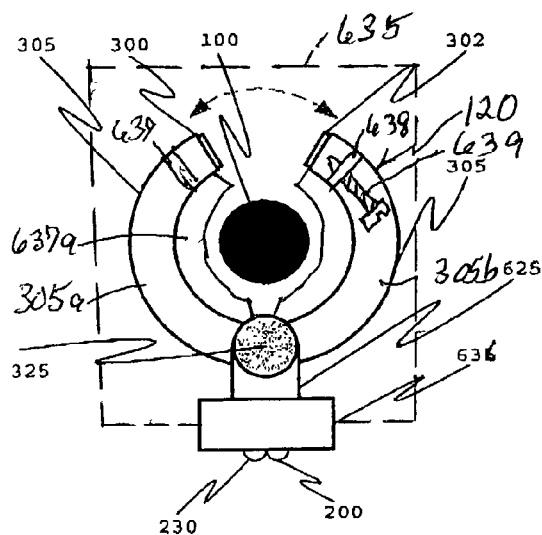
FIG. 6 is an end view of one embodiment of the coupler secured to a power line and with the power line illustrated in cross-section.

FIG. 6 illustrates an embodiment of the structure 305 of FIG. 4 combined with the electrical components of the coupler 120 to form the coupler 120. As mentioned, the coupler 120 is housed in a weather resistant housing which has been removed in FIG. 6, but which is indicated by dashed lines 635 in FIG. 6. The housing can be of any type and preferably is made of a sun-resistant plastic and can be opened to permit placing of the structure 305 with the parts or portions 305a and 305b around the cable 100 and securing of the structure 305 to the cable 100. The cable 100 can have a plastic covering, e.g., a plastic outer sheath.

The electrical components of the coupler 120 can be encapsulated in plastic or enclosed in a housing 636 which is pivotally mounted by an arm 625 from the pin 325 so that the aiming of the transmitter 200 and the receiver 230 can be adjusted.

The structure 305, when the parts 305a and 305b are brought together so that the contacts 300 and 302 interengage, clamps onto the cable 100. The parts 305a and 305b are held together and apply radially inwardly directed forces on the cable 100. Since the parts 305a and 305b can be relatively rigid, a split ring 637 of elastomeric material can be attached to the surfaces of the parts 305a and 305b to aid in clamping the structure 305 on the cable 100 and accommodating small irregularities of the exterior and size of the cable 100.

The parts 305a and 305b can be forced against and held connected in any desired manner, e.g., by clamps, latches, screws or bolts. FIG. 6 shows two of two pairs of extensions or flanges 637 and 638 secured to or integral with the casing of the parts 305a and 305b and a self-tapping screw 639 which can extend between the flanges 637 and 639 and pull them, and hence, the parts 305a and 305b, toward each other when the screw 639 engages the flange 637 and is rotated. A pair of flanges similar to flanges 637 and 638 and a screw similar to the screw 639 would be similarly located at the opposite end of the parts 305a and 305b which are not visible in FIG. 6.

Although preferred embodiments of the present invention have been described and illustrated, it will be apparent to those skilled in the art that various modifications may be made without departing from the principles of the invention.

The invention claimed is:

1. A power line communication system in which a first power line is coupled to a second power line by a transformer and modulated radio frequency communication signals are supplied to the first power line, both the first and the second power line transmitting alternating current at a frequency which is low relative to the frequency of the radio frequency signals, the system comprising:

conductive wiring at the premises of a customer coupled to the second power line for conveying electrical power;

processing apparatus at the premises coupled to the wiring for processing the communication signals and for supplying modulated communication signals;

coupling apparatus coupled to the first power line and to the wiring for supplying communication signals from the first power line to the processing apparatus and to the first power line from the processing apparatus, the coupling apparatus comprising:

a coupler including a first transceiver for receiving the communication signals from the first power line and transmitting electromagnetic energy modulated with the modulation of the communication signals and for receiving other electromagnetic energy modulated with the modulation of other modulated communication signals and transmitting modulated communication signals to the first power line;

a base unit spaced from the coupler including a second transceiver for receiving the modulated electromagnetic energy transmitted by the first transceiver and coupled to the wiring for transmitting to the wiring communication signals modulated with the modulation of the electromagnetic energy received from the first transceiver and coupled to the wiring for receiving modulated communication signals from the processing apparatus and transmitting to the first transceiver the other electromagnetic energy; and an induction coil inductively coupled to the first power line and coupled to the first transceiver for supplying communication signals from the first transceiver to the first power line and receiving communication signals from the first power line and supplying the received communication signals to the first transceiver.

2. A system as set forth in claim 1 wherein the induction coil has separable parts permitting placement of the coil around the first power line without interrupting the continuity of the first power line.

3. A system as set forth in claim 1 wherein the electromagnetic energy is infra-red energy.

4. A system as set forth in claim 1 wherein the electromagnetic energy is radio frequency energy.

5. A system as set forth in claim 1 wherein the transmission medium for the electromagnetic energy is air.

6. A system as set forth in claim 1 further comprising an electromagnetic energy cable coupling the first and the second transceivers.

7. A system as set forth in claim 1 wherein the processing apparatus receives and transmits radio frequency communication signals and the second transceiver is coupled to the wiring by a radio frequency transmission apparatus.

8. A system as set forth in claim 7 wherein the transmission apparatus includes a cable for conveying radio frequency energy.

9. A system as set forth in claim 1 wherein the first transceiver includes electrical components and a power supply for supplying electrical power to the components and wherein there is a further induction coil coupled to the power supply and to the first power line for supplying electrical power to the power supply.

* * * * *